United States Patent
Speier et al.

(10) Patent No.: US 8,443,162 B2
(45) Date of Patent: May 14, 2013

(54) METHODS AND APPARATUS FOR DYNAMICALLY MANAGING BANKED MEMORY

(75) Inventors: Thomas Philip Speier, Holly Springs, NC (US); James Norris Dieffenderfer, Apex, NC (US); Ravi Rajagopalan, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 2178 days.

(21) Appl. No.: 11/040,600

(22) Filed: Jan. 21, 2005

(65) Prior Publication Data
US 2006/0168390 A1 Jul. 27, 2006

(51) Int. Cl.
*G06F 13/00* (2006.01)
*G06F 13/28* (2006.01)

(52) U.S. Cl.
USPC ............... 711/170; 711/5; 711/128; 711/173; 711/E12.046

(58) Field of Classification Search .................... None
See application file for complete search history.

(56) References Cited

U.S. PATENT DOCUMENTS

| | | | |
|---|---|---|---|
| 5,410,669 A | | 4/1995 | Biggs et al. |
| 5,854,761 A * | | 12/1998 | Patel et al. ............... 365/49.11 |
| 6,108,745 A * | | 8/2000 | Gupta et al. ............... 711/3 |
| 6,606,686 B1 * | | 8/2003 | Agarwala et al. ........... 711/129 |
| 2005/0185796 A1 * | | 8/2005 | Lablans ..................... 380/268 |

FOREIGN PATENT DOCUMENTS

| | | |
|---|---|---|
| CN | 1347527 | 5/2002 |
| EP | 1237344 | 2/2002 |
| TW | 440762 B | 6/2001 |
| TW | 445405 B | 7/2001 |
| TW | 200416535 | 9/2004 |
| WO | 0144948 | 6/2001 |

OTHER PUBLICATIONS

International Search Report and Written Opinion—PCT/US2006/001934, International Searching Authority—European Patent Office, Aug. 31, 2006.
Taiwan Search Report—TW095102400—TIPO—Apr. 9, 2012.

* cited by examiner

*Primary Examiner* — Reginald Bragdon
*Assistant Examiner* — Eric S Cardwell
(74) *Attorney, Agent, or Firm* — Peter Michael Kamarchik; Nicholas J. Pauley; Joseph Agusta

(57) ABSTRACT

Techniques for controllably allocating a portion of a plurality of memory banks as cache memory are disclosed. To this end, a configuration tracker and a bank selector are employed. The configuration tracker configures whether each memory bank is to operate in a cache or not. The bank selector has a plurality of bank distributing functions. Upon receiving an incoming address, the bank selector determines the configuration of memory banks currently operating as the cache and applies an appropriate bank distributing function based on the configuration of memory banks. The applied bank distributing function utilizes bits in the incoming address to access one of the banks configured as being in the cache.

24 Claims, 5 Drawing Sheets

METHODS AND APPARATUS FOR DYNAMICALLY MANAGING BANKED MEMORY

BACKGROUND OF THE INVENTION

1. Field of the Invention

The present invention relates generally to techniques for allocating a number of cache memory banks, and, more particularly, to techniques for varying the number of memory banks utilized as cache memory and employing one or more memory banks as non-cache or local memory for a given application.

2. Relevant Background

Power consumption and operating speed constraints of central processing units (CPUs) including digital signal processors (DSPs) may limit the overall performance of mobile devices. Processing units may utilize banked memory to improve access time to data co-resident on the same integrated circuit as the processing unit thereby reducing the length of data and instruction paths to the data, which other wise may be stored farther from the processing unit. In such approaches, the number of banks in banked memory may be fixed at design time. Banked memory may be used for caching recently used instructions, data, or both. Alternatively, banked memory may also be used for fast local memory access, e.g. cache. However, once a function for bank memory is chosen at design time, the chosen function of banked memory becomes fixed.

Some conventional approaches to banked cache memory are limited in that the number of banks reserved for cache memory commonly equals a power of two. An address tag, which is used to compare against a cache tag in the banked memory, is commonly composed of bits extracted from an incoming address field and thus the number of entries a tag can select, or tag space, is a power of two. For example, one conventional approach utilizes eight banks of memory for its cache memory. Together, the eight banks are configured as an eight-way associative cache, meaning that an incoming address will cause eight cache tags, one cache tag in each bank, to be compared against the address tag carried in the incoming address. The data output of each bank is then multiplexed to select the correct bank based on the bank with the matching cache tag.

In this conventional approach, each cache access causes comparators to be enabled in each of the eight banks and the tag space can specify every cache line in the cache memory. In such an approach, reuse of one of the eight banks for other purposes is commonly not done because the tag space would not fully map to associated cache lines, potentially resulting in cache misses. Thus, simply reducing the number of banks allocated to a cache and remapping the remaining banks for another type of usage may increase power consumption and reduces the effectiveness of the cache.

Another conventional approach to banked cache memory may involve extracting one or more bits from an incoming tag to select a particular bank. Due to the extracted bits used to select a particular bank, this approach also commonly defines the number of banks in the cache to be a power of two. For example, if four banks are used, two bits are extracted from the incoming tag to specify a particular bank. For example, bit value 00 may indicate bank I, bit value 01 may indicate bank II, bit value 10 may indicate bank III, and bit value 11 may indicate bank IV. Once the two bits are extracted from the incoming tag, the particular bank for cache access is thus selected.

Where this approach is adapted for use with three banks, two bits would still be needed to specify a particular bank and two of the four values would indicate the same bank. As a result, the mapping of two values to the same bank would commonly cause the same bank to be selected twice as often as the other two banks, which can result in cache conflicts and an uneven distribution of cache data among the memory banks.

SUMMARY OF THE DISCLOSURE

When banked memory is used as a banked cache, the working size of the banked cache, or the number of entries that can be stored in the banked cache, may vary depending on the software application which runs on the processing unit. Among its several aspects, a first embodiment of the invention recognizes that a need exists for providing a mechanism for varying caching techniques depending on the different software applications which execute on a processing unit. To this end, this embodiment includes a configuration tracker for configuring a portion of memory banks to operate as cache memory while a second portion is utilized for another non-cache purpose, such as usage as additional local memory, as addressed further below. This embodiment also includes a bank selector. The bank selector may suitably employ one or more bank distributing functions. Depending on the number of cache banks configured, the bank selector selects an appropriate bank distributing function to distribute cache accesses in a balanced manner across banks configured as cache memory.

One advantage of such an approach includes the ability to vary the cache size within banked memory such that memory banks not needed for a particular application can be utilized for other purposes such as fast local memory. Another advantage includes the ability under software control to vary the number of banks allocated to cache memory. By dynamically varying the number of banks allocated to cache memory, many advantages arise such as preventing a bank containing a manufacturing defect from being used, tailoring the size of cache memory to suit a particular software application, and the like. Another advantage includes the ability to reduce power consumption by enabling one cache bank on each cache access. Additionally, when less then all of the memory banks are allocated as cache banks, techniques are provided to balance cache accesses so that the cache accesses to each of the cache banks are substantially equal.

A more complete understanding of the present invention, as well as further features and advantages of the invention, will be apparent from the following Detailed Description and the accompanying drawings.

DETAILED DESCRIPTION

The present invention will now be described more fully with reference to the accompanying drawings, in which several embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Figure 1:
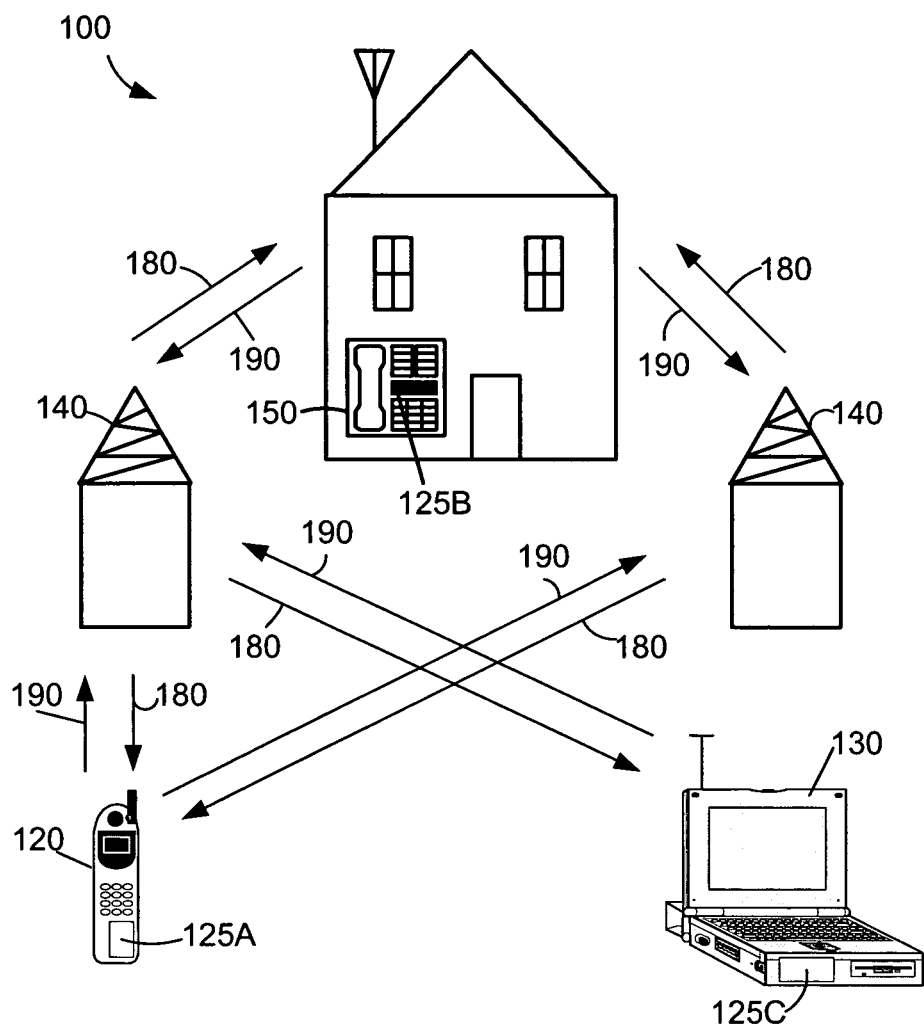
FIG. 1 is an illustration of an exemplary wireless communication system in which an embodiment of the invention may be advantageously employed.

FIG. 1 is an illustration of an exemplary wireless communication system 100 in which an embodiment of the invention may be advantageously employed. For purposes of illustration, FIG. 1 shows three remote units 120, 130, and 150 and two base stations 140. It will be recognized that typical wireless communication systems have many more remote units and base stations. Remote units 120, 130, and 150 include hardware components 125A, 125B, and 125C, respectively. These hardware components include bank memory allocation circuitry as discussed further below. FIG. 1 shows a forward link signal 180 from the base stations 140 and the remote units 120, 130, and 150 and reverse link signal 190 from the remote units 120, 130, and 150 to base stations 140.

In FIG. 1, remote unit 120 is shown as a mobile telephone, remote unit 130 is shown as a portable computer, and remote unit 150 is shown as a fixed location remote unit in a wireless local loop system. For example, the remote units may be cell phones, hand-held personal communication systems (PCS) units, portable data units such as personal data assistants, or fixed location data units such as meter reading equipment. Although FIG. 1 illustrates remote units according to the teachings of the invention, the invention is not limited to these exemplary illustrated units. The invention may be suitably employed in any processing environment where a cache memory subdivided into banks is utilized and all of the banks are not required for cache storage purposes for a given software application.

Figure 2:
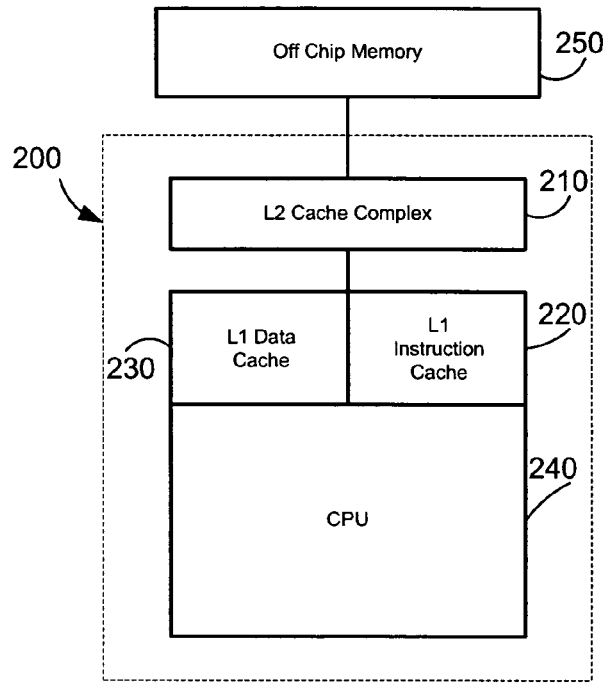
FIG. 2 is an illustration of a processor complex in which an embodiment of the invention may be advantageously employed.

FIG. 2 is an illustration of a processor complex 200 in which an embodiment of the invention may be advantageously employed. The processor complex 200 may be suitably employed in the above mentioned components 125A-C. The processor complex 200 includes a central processing unit (CPU) 240, a level 1 (L1) data cache 230, a L1 instruction cache 220, and a level 2 (L2) instruction and data cache 210 and may be disposed on a common chip. The CPU 240 is coupled to the level 1 data cache 230, level 1 instruction cache 220, and the level 2 cache 210. The CPU 240 retrieves instructions and data from the caches in a hierarchical fashion. For example, when the CPU 240 needs to fetch an instruction, CPU 240 will access level 1 instruction cache 220 to determine if the instruction is there based on an address match. If there is no address match in the level 1 instruction cache 220, CPU 240 will access the level 2 instruction and data cache 210. Similarly, when the CPU 240 needs to fetch data, CPU 240 will access level 1 data cache 230 to determine if the data is there based on an address match. If there is no address match in the level 1 data cache 230, CPU 240 will access the level 2 instruction and data cache 210. Commonly, CPU 240, L1 data cache 230, L1 instruction cache 220 and L2 cache 210 may be embodied in a common chip. In that event, where an instruction or data is not available on chip, an access to off chip memory 250 will occur.

While the discussion which follows is principally in the context of the L2 cache 210, it will be recognized that the embodiments of the invention may be employed in any or all of the caches 210, 220, and 230. The embodiments of the invention are not limited to the illustrated processor complex 200 and are further applicable to other processor complexes utilizing a cache memory as discussed further herein.

Figure 3:
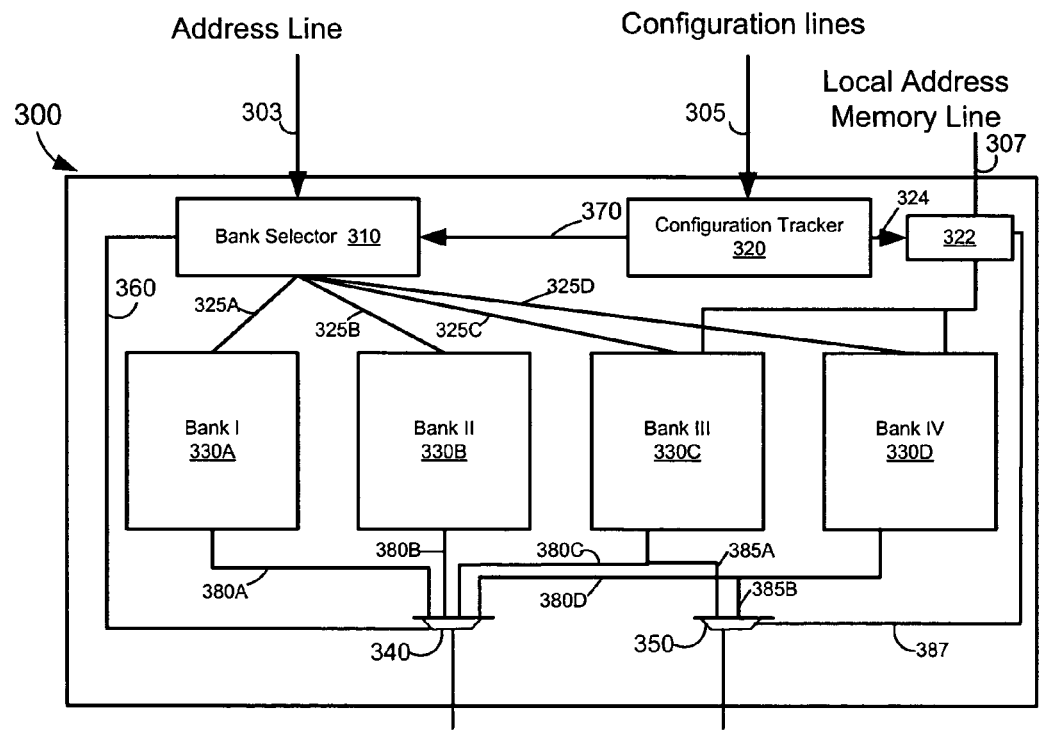
FIG. 3 is an illustration of a cache complex in accordance with an embodiment of the invention.

FIG. 3 is an illustration of one embodiment of a cache complex 300 in accordance with the teachings of the invention. The cache complex 300 may be suitably employed as one or more of the caches 210, 220, and 230. The cache complex 300 includes a bank selector 310, a configuration tracker 320, an address range selector 322, four memory banks 330A-D, and multiplexers 340 and 350. By way of example, the four memory banks 330A-D may each comprise 64 kbytes of memory, and collectively comprise 256 kbyte L2 cache 220. As a further example, in a number of cell phone applications, 256 kbytes of L2 cache may not be needed, but it may be highly desirable to have more fast on chip local data memory. For example, in doing multimedia processing utilizing the techniques of the present invention, packets can be streamed into additional local memory thereby eliminating or substantially reducing the need to do off chip operations.

Returning to FIG. 3, the cache complex 300 may operate in two modes and may change between these operating modes depending on the software executing on a corresponding processor, such as CPU 240. In the first mode, the cache complex 300 may operate solely as a cache. In this mode, all memory banks are accessed by comparing a cache tag in order to retrieve or store cache data. In the second mode, the cache complex 300 may operate as a combination cache and local memory repository where two or more of the memory banks 330A-D are accessed as cache memory and the remaining memory banks are accessed as non-cache memory such as a local memory. The number of memory banks being accessed as cache memory may vary depending on the needs of a software application currently executing on a processor, such as CPU 240, coupled with the memory banks.

The configuration tracker 320 stores values that indicate which memory banks are to be accessed as cache memory and which memory banks are to be accessed as local memory. Configuration lines 305 are coupled to the configuration tracker 320 to carry inputs for setting values of configuration tracker 320 in order to configure which memory banks will be utilized as cache and which memory banks, if any, will be utilized as local memory. A software application may invoke or cause to invoke an instruction which results in setting the configuration lines 305 allowing the software application to tailor the size and operation of the banked memory according to its own needs. The configuration tracker 320 may include a hardware register or other memory device which can hold data indicating how each memory bank is configured.

The bank selector 310 is coupled to the configuration tracker 320 to retrieve values stored in the configuration tracker 320. The bank selector 310 also receives an incoming address over address line 303. As will be described further in connection with FIG. 4, the bank selector 310 extracts one or more bits from the incoming address to determine which memory bank should be selected for cache comparison. The bank selector 310 communicates information carried in the incoming address to any one or all of memory banks 330A-D through control lines 325A-D. For ease of illustration, only control lines 325 A-D are shown. However, the bank selector 310 is further coupled to each memory bank to individually enable a selected memory bank on a cache access.

In the embodiment illustrated in FIG. 3, memory banks 330A-D, may be content addressable memory (CAM) banks.

For example, each CAM bank may contain 64 kbytes of data or instructions and is four-way set associative, meaning that each cache access results in four cache tag comparisons within a CAM bank. It should be noted that although the present discussion focuses on CAM banks, other type memory banks which can be accessed through cache techniques may also be utilized.

In the embodiment shown, all four banks 330A-D can be utilized as cache. Alternatively, one or both of the banks 330C and 330D can be utilized as extra local memory for applications where less than four banks of cache memory are necessary as discussed further below. Memory banks 330A-D have their output ports coupled over output lines 380A-D, respectively, to multiplexer 340. Memory banks 330C and 330D also have their output ports coupled over output lines 385A and 385B, respectively, to multiplexer 350. The bank selector 310 selects which of the bank outputs will be outputted from the cache complex 300 by sending a select signal over control line 360. The bank selector 310 reads which banks are currently being used as cache banks over signal line 370. Memory banks 330C and 330D also receive input over local memory address line 307.

The address selector 322 is coupled to the local memory address line 307 and memory banks 330C and 330D. Optionally, the address selector 322 may be coupled to the configuration tracker 320 by signal lines 324. In this embodiment, the address selector may ignore incoming addresses over local memory address line 307 upon being signaled that memory banks 330C and 330D are being used as cache memory. However, when memory banks 330C and 330D are configured as local memory, the address range selector 322 receives an incoming address over local memory address line 307. The address range selector 322 based on the address value, determines whether to select and activate memory bank 330C or 330D. The address range selector 322 receives and forwards the address to the selected bank. Also, the address range selector 322 selects between output lines 385A and 385B by sending an enable signal over enable line 387 to multiplexer 350. Although FIG. 3 has been described in the context of 64 kbyte memory banks which are four way set associative, it should be noted that the teachings of the invention contemplate other size memory banks and other set associativity as well. As an example, an eight bank memory in which up to three banks can be utilized as additional local memory might be employed.

It should be noted that the cache complex 300 also allows one or two memory banks to operate in non-cache access mode while the other memory banks operate in cache access mode. Let's assume that the configuration tracker 320 indicates that banks 330A-C are to be used as cache banked memories and bank 330D is to be used as local memory. When an incoming address arrives over address line 303 at bank selector 310, the bank selector 310 reads the configuration tracker 320 and determines whether to activate bank 330A, 330B, or 330C. If, in the dual mode example, there are a number of memory banks that do not equal a power of two, this embodiment of the invention achieves substantially equal distribution between memory banks by performing a bank distributing function to distribute cache accesses in a balanced manner. In the example shown, an operation on bits in the address tag field is employed to select an appropriate memory bank rather than directly utilizing specific bits in the address tag. Such an operation may be conducted utilizing exclusive-or (XOR) circuitry or a modulo 3 reduction circuit to reduce a number of bits from in the address tag field to two bit positions in order to select one of three memory banks as described further in connection with the discussion of FIG. 5.

Local memory address line 307 is used to directly access entries in memory bank 330D in a known way. For example, each non-cache memory bank represents a range of memory addresses. The value of the incoming address determines which non-cache memory bank is selected. For example, if the value of the incoming address falls within the range represented by memory bank 330C then memory bank 330C is selected. The cache complex 300 may operate in an all cache mode, a local memory mode, or a combination of cache and local memory mode. The cache complex 300 may simply change modes of operations by changing the values of the configuration tracker 320. This flexibility allows software applications which have different cache needs to be satisfied by adapting accordingly the number of memory banks which are cache banks.

Figure 4:
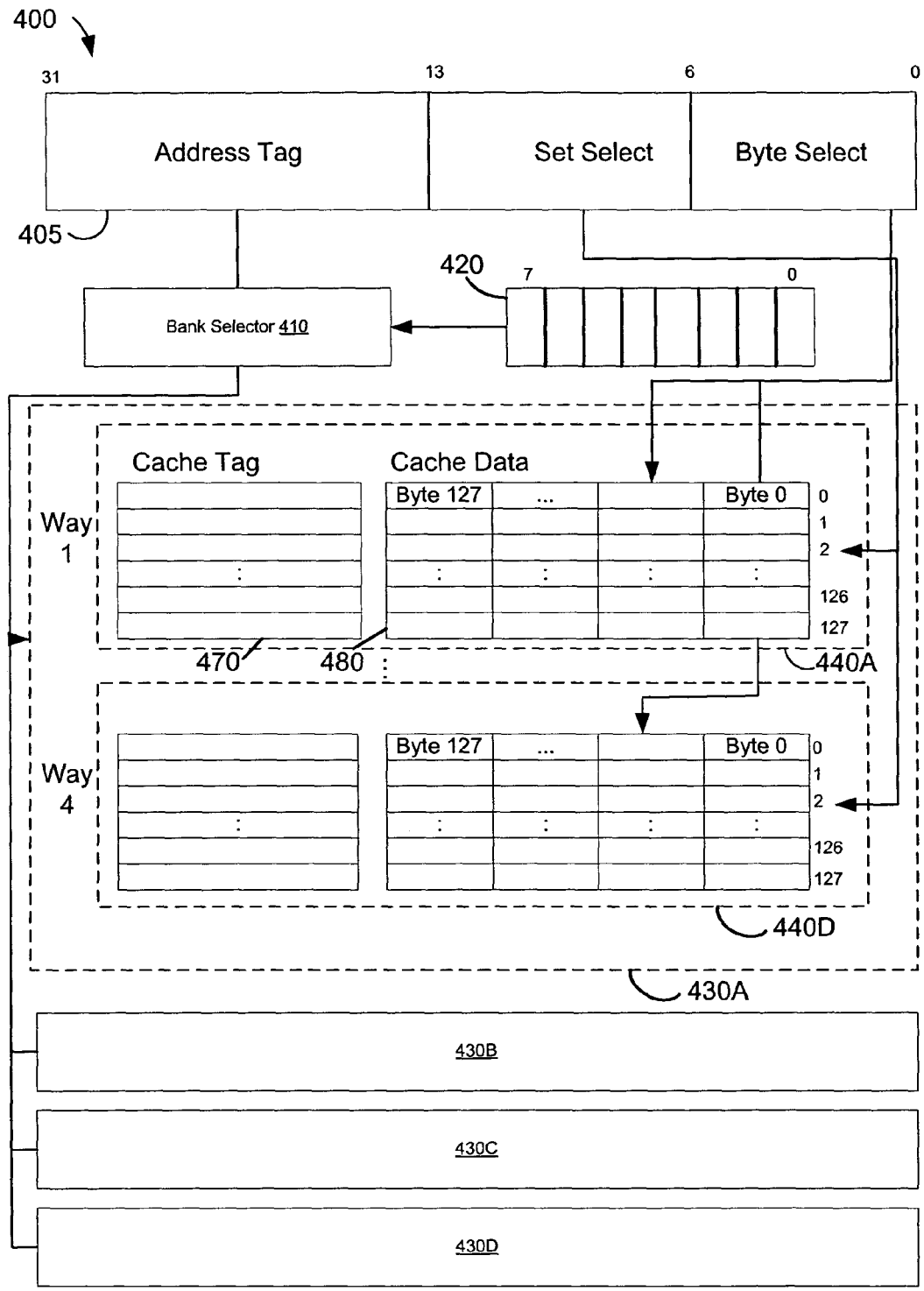
FIG. 4 is a block diagram illustrating an exemplary operation of the cache complex shown in FIG. 3.

FIG. 4 shows a block diagram 400 illustrating further details of one exemplary operation of a cache complex in accordance with the invention. The block diagram 400 shows an incoming address 405, a bank selector 410, a configuration tracker 420, and memory banks 430A-D. For ease of illustration, only the contents of memory bank 430A are shown. Each memory bank is four way set associative. Referring to memory bank 430A, two of the four ways, ways 440A and 440D, are illustrated. Each cache line entry 0, 1, 2, . . . 127 has a cache tag 470 and cache data 480. As shown in FIG. 4, the cache data 480 is divided up into 128 addressable bytes.

The incoming address 405 has 32 bits. The most significant 18 bits, bits 31-14, are used for two purposes. One purpose is to select which memory bank is to be accessed. Further details of the bank selector 410 will be discussed in connection with FIG. 5. The other purpose is to provide an address tag against which cache tag 470 is compared. The next seven bits, bits 13-7, indicate which cache line entry 0, 1, 2, . . . 127 is to be selected. Optionally, the final seven bits, bits 6-0, indicate which byte is selected within the cache data 480. Although FIG. 4 illustrates a 32 bit incoming address, it should be noted that the teachings of the invention contemplate other size addresses as well.

By way of example, assume that a 32 bit incoming address has a value represented in hexadecimal format as 0xEFEF2102. The bank selector 410 retrieves the configuration of the memory banks by reading the configuration tracker 420. For example, the configuration tracker 420 may be an eight bit register where bits 3-0 correspond to memory banks 430A-D, respectively. If, for example, the bit value in bit position 0 is a 1, then the corresponding memory bank, memory bank 430D, is used for caching. If the bit value is 0, then the corresponding memory bank is used for local memory. Assuming that the configuration tracker 420 indicates that all four memory banks 440A-D are currently operable for caching, then all four bits 3-0 are 1. By reading the configuration tracker 420, the bank selector 410 also determines that bits 15 and 14 of incoming address 405 should be considered to indicate which memory bank to select for cache comparison. Since bits 15 and 14 of hexadecimal address 0xEFEF2102 are 00, then memory bank 430A is selected and enabled.

In one embodiment of the invention, the configuration tracker 420 may contain four bits, bit positions 7-4, for example, to specify which bit combination in the address field should be used either directly or indirectly for bank selection. If the address bits are used directly, the values of the bits extracted from the incoming address are used to select an appropriate memory bank for a cache access.

By way of example, the configuration tracker 420 may specify a stride pattern as a technique for directly selecting a bit combination from the incoming address. In a stride pattern, consecutive incoming addresses are related to each other in the following manner. Consecutive addresses have particular bit fields that increment by a known amount between incoming addresses. Consequently, the bank selector 410 may utilize the varying bit fields to equally distribute consecutive memory accesses to each of the four memory banks. For example, if the stride pattern is 128 bytes and the number of banks used as cache is four, the bank selector 410 would utilize bit positions 8 and 7 in the incoming address to select the appropriate bank for cache look up. Because the stride is a power of two and the number of memory banks is four, two bit positions in the incoming address are used for the bank selector 410 to base its decision on which bank to access. Stride patterns may typically arise when a software application is utilized that processes data according to one of the many moving picture experts group (MPEG) video standards.

In this embodiment, bit positions 7-4 of the configuration tracker 420 may be encoded to indicate a stride size which in turn corresponds to specific bit positions within the incoming address. Based on the values received from configuration tracker 420, the bank selector 410 selects the appropriate bit positions from the incoming address which correspond to the stride pattern in order to equally distribute cache accesses. In summary, the bank selector 410 takes an incoming address as an input, as well as, values of the configuration tracker 420 to determine which memory bank to read from or write to as a cache.

If the address bits are used indirectly, the bank selector 410 performs a predetermined bank distributing function such as modulo reduction or an exclusive-or (XOR) reduction logic on the specified bits to select and enable an appropriate bank for cache access. As further described in FIG. 5 below, the bank selector optionally chooses from a number of bank distributing functions based on the number of banks currently configured as cache memory banks.

In another embodiment of the invention, the configuration tracker 420 may cause the bank selector 410 to choose a bank distributing function for determining an appropriate memory bank. Depending on the value of the configuration tracker 420, the bank selector 410 will select one out of a number of bank distributing functions. Further details of selecting between different bank distributing functions within the bank selector are provided below in connection with the discussion of FIG. 5.

Returning to the example of incoming address 0xEFEF2102, bank selection operation is demonstrated. Bits 15 and 14 of the incoming address contain the bit values 00, these values result in the bank selector 410 selecting memory bank 430A. Bits 13-7 of the incoming address contain the bit values 0000010 to select cache line 2 in ways 440A-D. Bits 6-0 of the incoming address contain the bit values 0000010 to specify byte 2 for retrieval. Bits 31-14 constitute the address tag and are compared against the cache tag found at cache line 2 of each way 440A-D to determine if a match exists. If so, byte 2 in the cache data 480 of the matched set is retrieved for output. It should be noted that the byte select may not be utilized such that the whole cache data portion of the selected cache line is retrieved for output.

Figure 5:
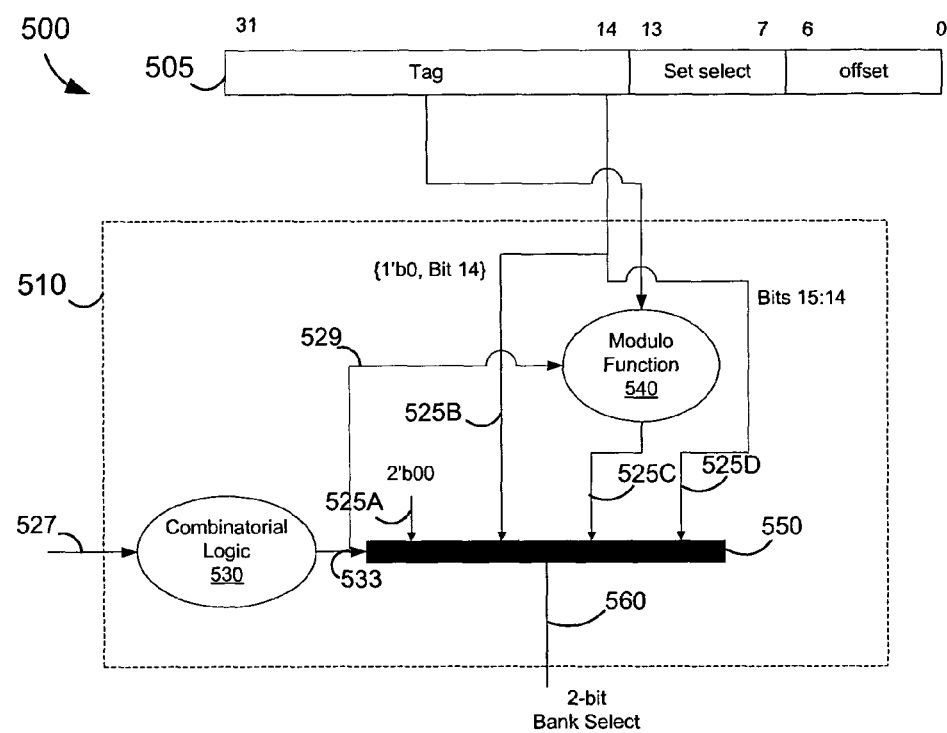
FIG. 5 is a block diagram illustrating an exemplary operation of a bank selector in accordance with an embodiment of the invention.

FIG. 5 is a block diagram 500 illustrating an exemplary operation of a bank selector in accordance with the teachings of the invention. The block diagram 500 includes an address register 505 for holding an incoming address and a bank selector 510 which can be suitably used as bank selector 310 and 410. The bank selector 510 includes a multiplexer 550, a modulo function circuit 540, and a combinatorial logic circuit 530. The multiplexer 550 receives four inputs 525A-D to couple to output 560. Each input corresponds to a different bank distributing function. Based upon the current configuration of the memory banks, the combinatorial logic circuit 530 generates a select signal to determine which one of the four inputs should be routed to output 560. Output 560 includes a two bit value to indicate which one of the four memory banks 330A-330D is enabled for cache access. The two bit value is used to create a select signal 360. Furthermore, output 560 may also include the address tag which is compared against the tag found in the enabled cache bank. After accessing the enabled cache bank, the enabled cache bank may be powered down.

The combinatorial logic circuit 530 receives inputs over signal line 527. Signal line 527 may be suitably similar to signal line 370. The combinatorial logic circuit 530 generates a select signal 533 which is independent of the address input 505. In the embodiment illustrated in FIG. 5, signal line 527 may comprise four inputs indicating which bank or banks are currently configured as cache and which bank or banks are currently configured as local memory. In the case of four memory banks, the combinatorial logic circuit 530 reduces the four inputs, each representing a particular memory bank, into a signal that selects which input signal 525A-D is coupled to output 560. For example, if the configuration tracker 320 indicated that only one bank of the four banks is utilized as cache, the directly selectable function corresponding to input signal 525A is selected and thus input signal 525A is then connected to output 560.

If the configuration tracker 320 indicated that two banks are utilized as cache, the directly selectable function corresponding to input signal 525B is selected, and, thus, input signal 525B will then be connected to output 560. If the configuration tracker 320 indicated three banks are utilized as cache, a bank distributing function corresponding to input signal 525C is selected, and, thus, input signal 525C will then be connected to output 560. If the configuration tracker 320 indicated all four banks are utilized as cache, the directly selectable function corresponding to input signal 525D is selected, and, thus, input signal 525D will then be connected to output 560. Although not shown in the FIG. 5, in order to enable the selected cache bank, the two bit value of output 560 would be reduced to an enable signal which would typically couple to a clock enable found on each memory bank.

When input 525A is selected, only one bank is configured as cache so this input 525A is hardwired to a two bit value of "00." This value will correspond to bank I, bank 330A or 430A for example. This directly selectable function is an example of a hardwired selection function.

When input 525B is selected, two banks are configured as cache. In this case, bit 14 of the incoming address in combination with a hardwired "0" value determines which of the two cache banks should be enabled. This bank distributing function is an example of a bit selectable function.

When input 525C is selected, three banks are configured as a cache. In this case where the number of cache banks is not a power of two, the modulo function circuit 540 is utilized to perform modulo 3 reduction of the tag value, bits 31-14, into two bits having values 0, 1, or 2 in order to select which one of the three cache banks to enable for the impending cache access. This bank distributing function is an example of a modulo balancing function. In general, the modulo function circuit 540 may comprise any combinatorial logic circuit which reduces multiple bits in the incoming address to a bit value which can select between the number of memory banks. Assuming the tag values are equally distributed, having at least more than five bits as input to the modulo function 540, should result in essentially equal distribution of cache accesses between banks configured as cache memory. For example, using 5 bits for input to modulo function circuit 540, $2^5$ or 32 samples are possible. Equally distributing 32 unique samples to three cache banks using a modulo 3 circuit would result in bank 0 having 11 accesses, bank 1 having 11 accesses, and bank 2 having 10 accesses for a distribution of 34.4% in banks 0 and 1 and 31.2% in bank 2.

It should be noted that optional select signal 529 may be utilized to select one of multiple modulo reduction operations within the modulo function circuit 540. Optional select signal 529 would then be utilized in the situation where there are more than four memory banks and the number of memory banks currently configured as the cache is not a power of two. For example, if there were eight memory banks and only six of those banks are utilized as cache, then the optional select signal 529 would select the modulo six circuit within the modulo function circuit 540. The modulo function circuit 540 would typically contain circuitry to handle modulo three, five, six, and seven. However, other modulo functions may be supported for memory bank sizes greater than eight.

When input 525D is selected, four banks are configured as cache. In this example, bits 15 and 14 of the incoming address are utilized to select which one of the four cache banks to enable for the subsequent cache matching operation. This directly selectable function is another example of a bit selectable function.

Figure 6:
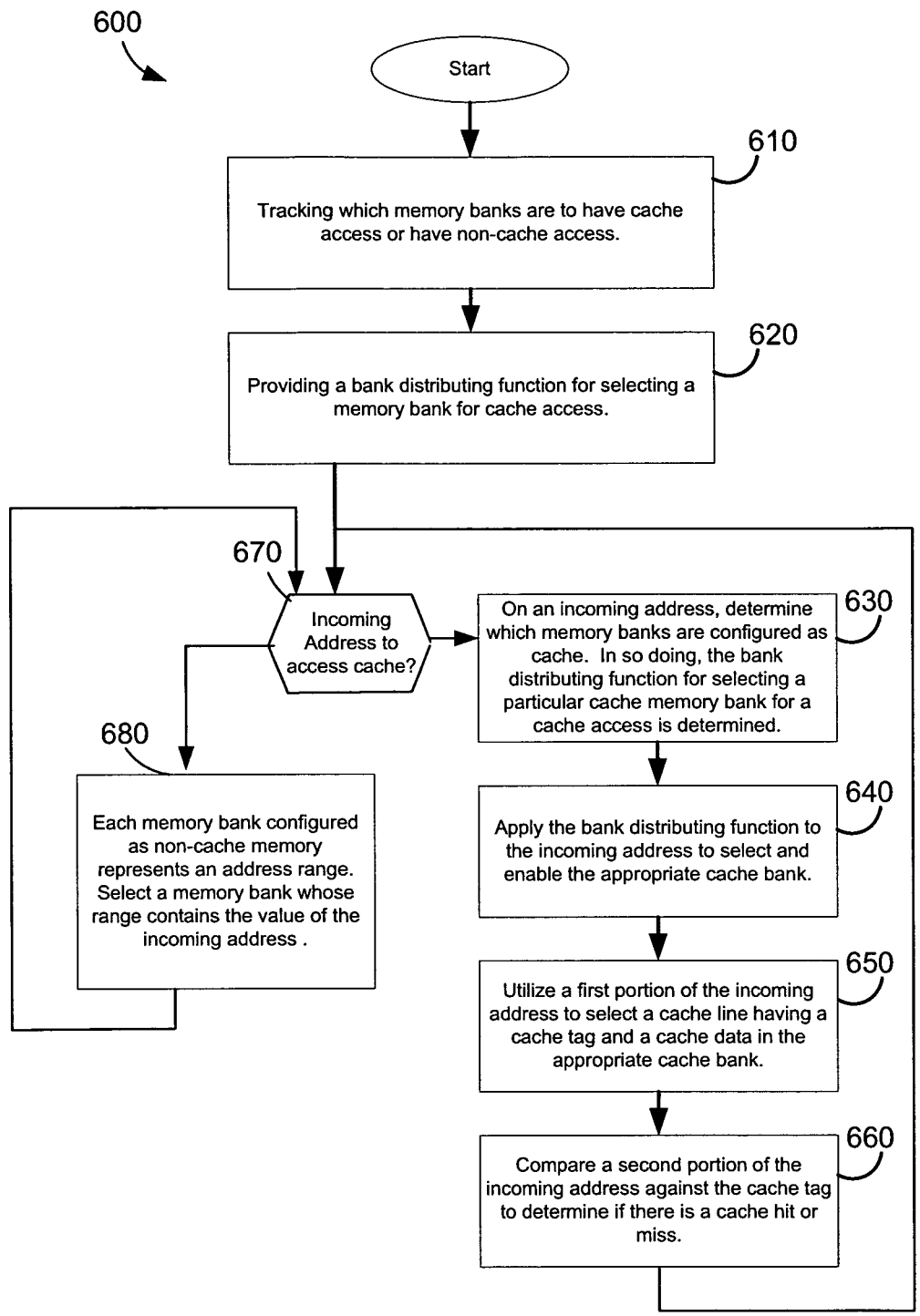
FIG. 6 is a flow chart illustrating a method of operating a number of memory banks allocated as cache memory in accordance with an embodiment of the invention.

FIG. 6 is a flow chart illustrating a method 600 of operating a number of memory banks allocated as cache memory in accordance with the teachings of the invention. At step 610, the method tracks which memory banks are currently configured as cache and which memory banks are currently configured as local memory, if any. At step 620, the method provides a bank distributing function to be used in selecting a memory bank for cache access such as the bank distributing function provided by modulo function circuit 540. At step 670, one of two parallel memory access paths may occur. In the first access path, an incoming address may be arriving over local memory address line 307 indicating non-cache access to memory. This situation presupposes that one or more memory banks are configured as local memory. In this situation, the method proceeds to step 680 where the memory bank selected is determined by the value of the incoming address. A memory bank is selected if the incoming address falls within the range of addresses defined by the memory bank. After accessing the local memory bank, the method proceeds to step 670 to await the next incoming address over address line 307 or 303.

In the second access path, an incoming address arrives over address line 303 indicating a cache access. In the second access path, step 670 proceeds to step 630. At step 630, on receiving an incoming address, the method 600 determines which memory banks are configured as cache. In so doing, the bank distributing function for selecting a particular cache memory bank for a cache access is also determined. At step 640, the method 600 applies the bank distributing function to the incoming address to select and enable the appropriate cache bank. At step 650, the method 600 utilizes a first portion of the incoming address to select a cache line having a cache tag and cache data in the appropriate cache bank. At step 660, the method 600 compares a second portion of the incoming address against the cache tag to determine if there is a cache hit or miss. Upon completing the cache access, the method proceeds to step 670 to await the next incoming address over address line 303 or 307.

While the invention is disclosed in the context of embodiments, it will be recognized that a wide variety of implementations may be employed by persons of ordinary skill in the art consistent with the above discussion and the claims which follow below.

We claim:

1. Apparatus for allocating a total number of banks of memory in a cache memory having more than two banks of memory, the apparatus comprising:
   a configuration tracker for configuring a first portion of the total number of banks of memory as cache memory and a second portion of the total number of banks of memory as non-cache memory; and
   a bank selector for receiving an incoming address, the bank selector applying a selected one of a plurality of bank distributing functions based upon the number of banks configured to the first portion to distribute cache accesses over the first portion of memory banks in a balanced manner when the number of memory banks in the first portion is both greater than two and is not a power of two.

2. The apparatus of claim 1 wherein the configuration tracker further comprises an input to receive information indicating which of the total number of banks of memory will be currently operating as cache memory, the configuration tracker reconfiguring the plurality of memory banks upon receiving an indication on the input of the configuration tracker.

3. The apparatus of claim 1 wherein the bank selector enables only one bank in the first portion corresponding to the incoming address.

4. The apparatus of claim 1 wherein the applied bank distributing function is a hardwired selection function.

5. The apparatus of claim 1 wherein the applied bank distributing function is a bit selectable function.

6. The apparatus of claim 1 wherein the applied bank distributing function is based on a stride pattern.

7. The apparatus of claim 1 wherein the applied bank distributing function is an exclusive-or (XOR) bank distributing function.

8. The apparatus of claim 1 wherein the applied bank distributing function is a modulo balancing function.

9. The apparatus of claim 1 wherein the apparatus is disposed on an integrated circuit chip.

10. The apparatus of claim 1 wherein the plurality of bank distributing functions include at least one of a hardwired selection function, a bit selectable function, a stride pattern, an exclusive-or (XOR) bank distributing function and a modulo balancing function.

11. The apparatus of claim 1 wherein the bank selector operates in a first mode in which each bank of memory is directly selectable and a second mode in which the bank distributing function is employed.

12. A method of allocating a total number of banks of memory, N, in a cache memory having more than two banks of memory, the method comprising:
   determining for an application that a number of banks of memory, A, are cache memory, and a number of banks of memory, B where B>1, are non-cache memory; and
   selectively applying one of a plurality of bank distributing functions to ensure that cache accesses to each of the A banks of cache memory are balanced.

13. The method of claim 12 further comprising:
   receiving an incoming address; and
   wherein the applying step applies one or more bits of the incoming address to the selected bank distributing function.

14. The method of claim 12 further comprising:
reconfiguring the number of banks of memory which are cache such that a second number of banks of memory, C, are cache memory where C>A.

15. The method of claim 12 further comprising:
reconfiguring the number of banks of memory which are cache such that a second number of banks of memory, C, are cache memory where C<A.

16. The method of claim 12 wherein the applying step further comprises accessing the cache memory, the method further comprising:
enabling only one bank in the cache memory when accessing the cache memory.

17. The method of claim 13 further comprising:
receiving a second incoming address; and
accessing non-cache memory B with bits from the second incoming address.

18. The method of claim 12 wherein the selectively applied bank distributing function is an exclusive-or (XOR), a hardwired selection function, a bit selectable function, a stride pattern or a modulo balancing function.

19. An apparatus for allocating a total number of banks of memory, N, in a cache memory having more than two banks of memory, the apparatus comprising:
means for determining for an application that a number of banks of memory, A, are cache memory, and a number of banks of memory, B where B>1, are non-cache memory; and
means for selectively applying one of a plurality of bank distributing functions to ensure that cache accesses to each of the A banks of cache memory are balanced.

20. The apparatus of claim 19 further comprising:
means for receiving an incoming address; and
wherein the applying means applies one or more bits of the incoming address to the bank distributing function.

21. The apparatus of claim 19 further comprising:
means for reconfiguring the number of banks of cache memory.

22. The apparatus of claim 19 wherein the applying means further comprises a means for accessing the cache memory, the apparatus further comprising:
means for enabling one bank in the banked memory when accessing the cache memory.

23. The apparatus of claim 19 further comprising:
means for receiving a second incoming address; and
means for accessing non-cache memory B with bits from the second incoming address.

24. The apparatus of claim 19 wherein the selectively applied bank distributing function is an exclusive-or (XOR), a hardwired selection function, a bit selectable function, a stride pattern or a modulo balancing function.

* * * * *